United States Patent [19]

McGill, III et al.

[11] Patent Number: 5,469,573
[45] Date of Patent: Nov. 21, 1995

[54] DISK OPERATING SYSTEM BACKUP AND RECOVERY SYSTEM

[75] Inventors: James K. McGill, III, Dover; Dorotea Abele, Sutton; Lonnie L. Colman, Natick; Manuel Gonsalves, Brookline; Sanjeev Saxena, Millbury, all of Mass.

[73] Assignee: Sytron Corporation, Westboro, Mass.

[21] Appl. No.: 23,091

[22] Filed: Feb. 26, 1993

[51] Int. Cl.⁶ ................................................. G06F 11/14
[52] U.S. Cl. ........................ 395/700; 364/280; 364/280.2; 364/280.3; 364/DIG. 1
[58] Field of Search .................................... 395/700, 650, 395/575

[56] References Cited

U.S. PATENT DOCUMENTS

| | | | |
|---|---|---|---|
| 4,493,034 | 1/1985 | Angelle et al. | 395/700 |
| 5,133,065 | 7/1992 | Cheffetz et al. | 395/575 |
| 5,134,580 | 7/1992 | Bertram et al. | 395/650 |
| 5,142,680 | 8/1992 | Ottman et al. | 395/700 |
| 5,155,833 | 10/1992 | Cullison et al. | 395/425 |
| 5,157,663 | 10/1992 | Major et al. | 371/9.1 |
| 5,210,875 | 5/1973 | Bealkowski et al. | 395/700 |
| 5,212,772 | 5/1993 | Masters | 395/200 |
| 5,269,022 | 12/1993 | Shinjo et al. | 395/700 |
| 5,276,865 | 1/1994 | Thorpe | 395/575 |

*Primary Examiner*—Kevin A. Kriess
*Attorney, Agent, or Firm*—Testa, Hurwitz & Thibeault

[57] ABSTRACT

This invention features a data backup procedure and apparatus for backing up and restoring, or otherwise loading a fully configured operating system to the high capacity storage device (e.g., hard disk) of a computer workstation, such as a personal computer. The method includes providing a first media having the desired operating system files to be loaded onto the storage device, providing a second media having configuration-specific data files, initializing the data processing system from the second media to provide a temporary operating system using the configuration-specific data files, loading the desired operating system files from the first media to the storage device using the temporary operating system, and reinitializing the data processing system with the desired operating system from the storage device. Embodiments of the method include providing the first media by copying the desired operating system files, or all the files, stored on the storage device to the first media. The copying can be achieved by running a data backup routine. Other embodiments include providing the configuration-specific data files to the second media by copying the configuration-specific data files from the storage device to the second media.

33 Claims, 8 Drawing Sheets

DISK OPERATING SYSTEM BACKUP AND RECOVERY SYSTEM

BACKGROUND OF THE INVENTION

The present invention relates to data backup and recovery on computer systems.

Personal computer workstations, such as the IBM-compatible Personal Computer (PC), have become popular today for a wide variety of computing tasks. Each PC typically includes one or more internal high capacity hard disk drives, and operates under a disk operating system to control the internal operation of the PC. For IBM-compatible PC's, commonly used disk operating systems today are IBM OS/2 (commercially available from IBM corporation), Microsoft MS-DOS, and Microsoft Windows 3.x (both commercially available from Microsoft Corporation, Redmond, Wash.).

The complexity of personal computers has increased dramatically in recent years. A wide variety of hardware and software options are available today for configuring a personal computer, adding to their complexity. Complex computer systems require similarly complex disk operating systems to support the wide variety of possible system hardware and software configurations available today. Because there are so many possible system configurations available, a typical operating system needs to be individually tailored for each personal computer system on which it is installed. This tailoring operation typically requires that a skilled technician spend several hours building the operating system on the personal computer according to the desired system configuration. This process is typically repeated for each system built, even if the configuration of that system is identical to one previously built.

Data stored on magnetic media disk drives, such as high capacity hard disks, are vulnerable to hazards such as "head crashes," accidental exposure to magnetic fields, loss of power during data writing operations, unintentional reformatting or data overwriting, or other destructive forces which can cause stored data to be lost. Data can also be lost by software failure, user error, hard storage device failure, or even loss or theft of the storage media or device.

Data backup systems, such as magnetic tape backup, are generally very useful for restoring corrupted or destroyed data files on the high capacity hard disk. However, these backup systems normally require that the disk operating system installed on the hard disk be intact and fully operational before data can be restored to the hard disk. A data loss affecting the operating system itself is typically not recoverable by using the tape backup system, and requires that the operating system be reloaded onto the hard disk and configured anew. Where the operating system was "factory loaded," reloading of the operating system onto the hard disk outside the factory may consume many hours of valuable user and technical support time.

Data backup systems are known which restore high capacity hard disks from a digital image of that hard disk, i.e., on a media bit-mapped basis. This type of image restoration may be able to restore an operating system to fixed storage media since the operating system is simply some portion of the total image being restored. However, any reformat or repartition of the hard disk, which is typically required after a head crash or other problem affecting the integrity of the media, can change the underlying logical structure of the hard disk which may make it impossible to restore a digital image to the hard disk without losing data.

SUMMARY OF THE INVENTION

The present invention provides a data backup procedure and apparatus for backing up and restoring, or otherwise loading a fully configured operating system to the high capacity storage device (e.g., hard disk) of a computer workstation, such as a personal computer. The invention quickly restores the operating system to the workstation from standard system backup media, such as magnetic backup tapes, without the need to reload and reconfigure the operating system from its original distribution media. The operating system can be restored regardless of whether the high capacity storage device has been reformatted, repartitioned, or otherwise replaced with an equivalent device. The present invention can also be used to efficiently factory load a fully configured operating system, and application software, into similarly configured workstations on a production line.

In general, in one aspect, this invention features a method for recovering or loading a desired operating system onto a storage device of a data processing system. The method includes providing a first media having the desired operating system files to be loaded onto the storage device, providing a second media having configuration-specific data files, initializing the data processing system from the second media to provide a temporary operating system using the configuration-specific data files, loading the desired operating system files from the first media to the storage device using the temporary operating system, and reinitializing the data processing system with the desired operating system from the storage device.

Preferred embodiments of the method include providing the first media by copying the desired operating system files, or all the files, stored on the storage device to the first media. The copying can be achieved by running a data backup routine. Other preferred embodiments include providing the configuration-specific data files to the second media by copying the configuration-specific data files from the storage device to the second media.

In yet other preferred embodiments, the second media is a removable, floppy diskette, the storage device is a hard disk drive, and the first media is a magnetic backup tape.

In still other preferred embodiments, the configuration-specific data files include system configuration files, operating system configuration files, and device drivers. The device drivers specifically include device drivers for using a tape backup device for reading the magnetic backup tape.

In yet other preferred embodiments, the method includes initializing the storage device prior to the step of loading the desired operating system files from the first media to the storage device. Initializing includes formatting and partitioning the storage device. A different desired operating system can be loaded from the first media to each partition of the storage device. Each partition is formatted using a format command and procedure specific to the particular desired operating system to be loaded into that partition.

In general, in another aspect, the invention features a method for loading a desired operating system onto a hard disk drive of a target data processing system, including configuring a hard disk drive of a model data processing system with the desired configuration for the target data processing system, copying the desired operating system files stored on the hard disk drive of the model data processing system to a first media, copying configuration-specific data files from the hard disk drive of the model data processing system to a second media, initializing the target data processing system from the second media to provide a temporary operating system using the configuration-specific data files, and loading the desired operating system files from the first media to a hard disk drive of the target data processing system using the temporary operating system.

BRIEF DESCRIPTION OF THE DRAWINGS

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE INVENTION

Figure 1:
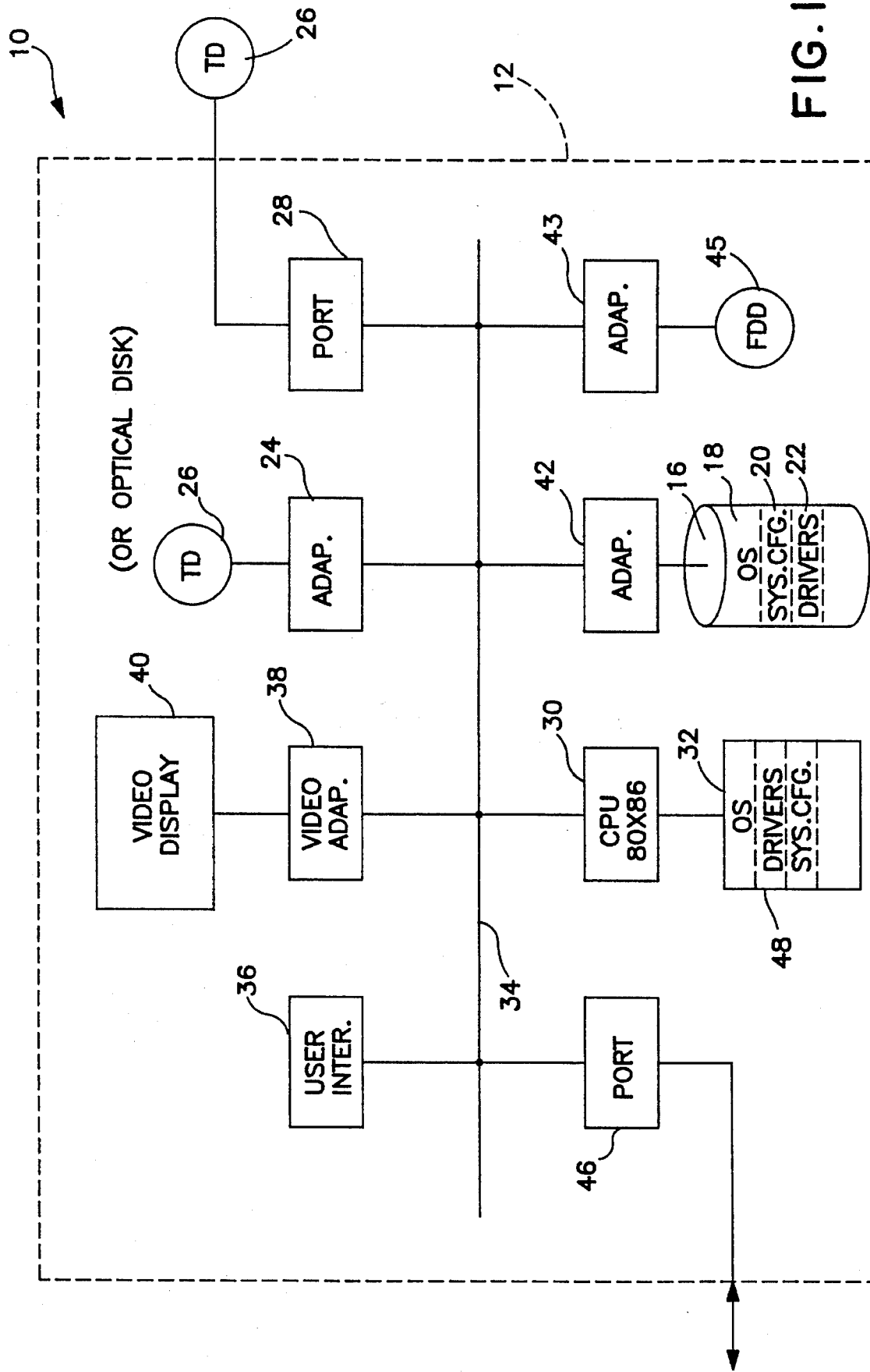
FIG. 1 is a functional block diagram of a PC workstation which utilizes the operating system recovery or loading features of this invention.

FIG. 1 shows one embodiment of a data processing system 10 which features the operating system recovery and loading of this invention. Data processing system 10 includes a computer workstation 12 which can be, for instance, an IBM-compatible personal computer (PC) operating under a disk operating system. The disk operating system of the embodiment described herein is IBM OS/2 (versions 1.2, 1.3x, 2.0 and 2.x), but could also be Microsoft MS-DOS, Microsoft Windows 3.x, UNIX, or another operating system.

Workstation 12 typically includes at least one high capacity storage device 16, such as a non-volatile magnetic media hard disk drive, which stores files necessary to start (boot) and operate the workstation. These files include operating system files 18, system configuration files 20, device driver files 22, and any other files necessary to properly configure and operate the workstation.

Workstation 12 also includes an interface 24 for connecting to a backup data device 26 such as a magnetic tape drive, optical disk drive, or a secondary hard disk drive. The backup data device may be physically located within the workstation, or may be a separate device temporarily connected to the workstation through a workstation data port 28, e.g. a parallel data port.

Workstation 12 also typically includes a processor 30, such as an Intel 80x86 device connected to a local high speed solid state memory 32 including read only memory (ROM) and random access memory (RAM). A high performance backplane channel 34 can connect the processor 30 to various devices in the workstation including a user interface 36, a video display adapter 38 for driving a video display 40, a hard disk drive adapter 42 for communicating with hard disk drive 16, a tape drive adapter 44 for communicating with the backup tape drive device 26, and a data port interface 46 for communicating with a wide variety of devices such as modems and printers. Typically, each interface and adapter device requires a specific software device driver 48 resident in memory 32 to operate the device in the configured workstation/operating system environment.

In another embodiment of the present invention, the operating system is the IBM OS/2 installed onto an IBM-compatible PC. Loading OS/2 onto the PC can take as long as three to five hours, involve as many as twenty-four diskettes which must be manually inserted into the PC when prompted by the installation program, and require the attention of a skilled computer operator. With the present invention, an entire OS/2 operating system, completely configured for the PC, can be loaded, or otherwise restored, onto the PC in under about ten minutes.

Figure 2:
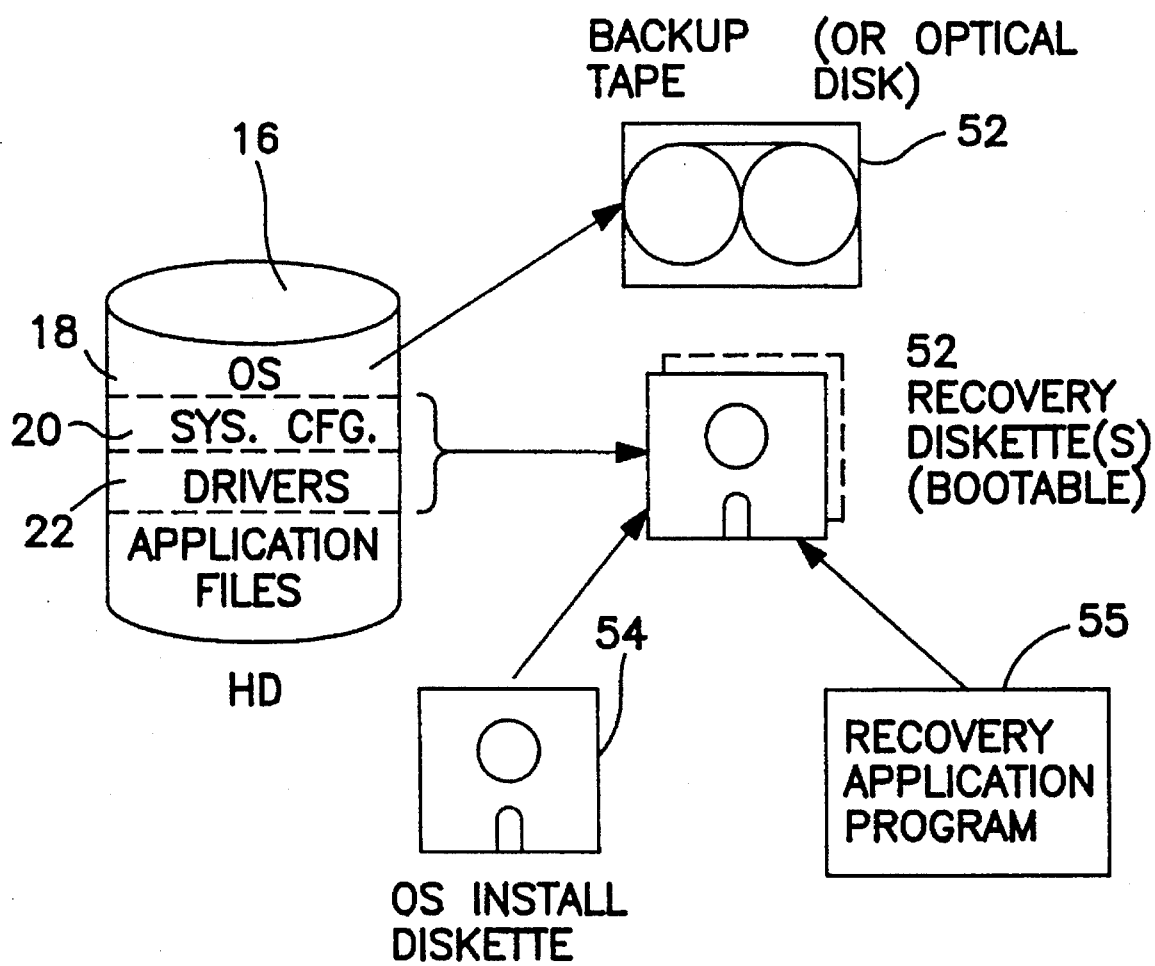
FIG. 2 is a functional block diagram of the data storage media for implementing the operating system recovery or loading features of this invention.

FIG. 2 is a functional block diagram showing the data storage media for implementing the operating system recovery or loading procedure of this invention. The PC hard disk drive 16 is first fully loaded and configured with operating system files 18, system configuration files 20, and device driver files 22. All the files stored on hard disk 16 are backed up to create one or more backup tapes 50, and device drivers 22 are copied from hard disk 16 onto a bootable recovery diskette 52. Operating system installation files are copied from the original disks 54 distributed with the operating system to make the recovery diskette a bootable diskette. The recovery diskette also includes the recovery application program 55 of this invention for implementing the recovery and loading procedures. The recovery diskette can further include a text file which identifies the PC system the recovery diskette belongs to.

To recover the fully configured operating system onto the hard disk 16, the PC system is started, or booted, from the bootable recovery diskette 52. The system configuration files 20 and device drivers 22 stored on the recovery diskette 52 are used to configure the system and provide the necessary device drivers to activate the PC devices, especially the backup tape drive 26. The operating system files 18, system configuration files 20 and device drivers 22 are then loaded from the backup tape 50 onto the hard disk 16 under control of a recovery diskette-loaded recovery application program. The PC can then be restarted from hard drive and any other backed up files can be restored to hard drive 32 from the backup tape 50.

Depending on the type of operating system to be loaded onto the hard disk, the recovery diskette can actually be a set of several recovery diskettes, each diskette containing a particular sub-set of files. For instance, for IBM OS/2 v. 1.2, 1.3x the recovery diskette set is actually made up of two recovery diskettes, one bootable disk containing a copy of the original OS/2 boot/install distribution disk files and some system configuration files, and the other diskette containing all executable files necessary to run the recovery or loading process and other required resource files. In contrast, for IBM OS/2 v. 2.0, 2.x the recovery diskette set includes up to four recovery diskettes, depending on the system configuration. In this case, one bootable disk contains a direct copy of the original boot disk distributed with the OS/2 v. 2.0, 2.x. Another disk contains modified copy of the OS/2 v. 2.0, 2.x "Install" disk (minus some files, plus configuration info files). A third disk contains all executable files necessary to run the recovery or loading process of this invention, and other resource files. Yet a fourth disk containing format information is required if multiple versions of OS/2, with the OS/2 boot manager, are to be recovered or loaded into the hard disk.

The number of recovery diskettes required is a function of the method in which the operating system is distributed, rather than by the requirements of the load or restore procedure of this invention. Thus, these recovery diskette sets will be referred to herein as the recovery diskette for simplicity, referring to removable media which is bootable, and contains all the needed operating system, system configuration, device driver, and recovery application program files.

Figure 3:
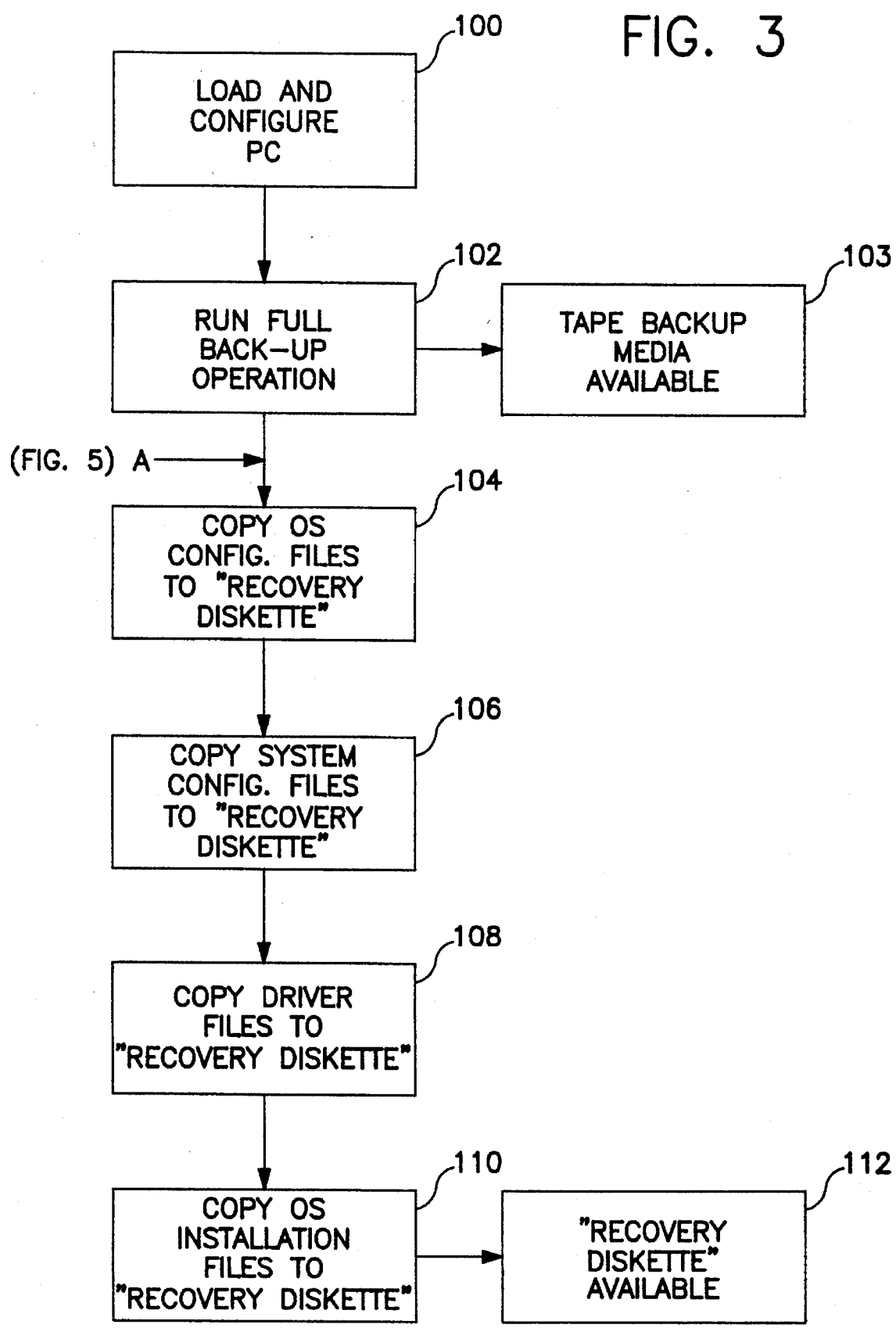
FIG. 3 is a flow diagram showing the storage media setup done prior to implementing an operating system recover or load procedure of this invention.

FIG. 3 is a flow diagram showing preparation steps performed prior to implementation of the operating system recovery and loading procedure of this invention. Prior to performing a recovery or loading operation with this invention, a PC is fully loaded and configured (100) as desired with the operating system, device drivers, configuration files, and application software including a tape backup program. The tape backup program should be capable of backing up the entire system in a manner where individual data files can be retrieved from the backup media and restored to the hard drive, rather than requiring a restoration of the entire image of the hard drive. One suitable backup program is Sytos Plus, which is commercially available from Sytron Corporation, 134 Flanders Road, Westboro, Mass. 01581, the assignee of the present application.

Next, a partial or full backup (102) of the PC hard disk is made to create a restorable backup media set (103) containing a copy of any or all files currently residing on the PC hard disk, including all operating system files, configuration files, and device drivers. This backup media set will be used as the source for the operating system subsequently loaded or restored onto the PC hard drive.

Next, a recovery diskette is prepared from the fully configured PC by copying various files from the hard disk onto the recovery diskette, which essentially define the current PC configuration. These copied files include vital operating system configuration files (104), system configuration files (106), and device drivers (108) which are required for the proper operation of the hardware, operating system, and attached devices. The most important device driver is the backup device driver, e.g., backup tape drive device driver, which must be available to activate the backup tape drive during the recovery or loading operation.

For instance, in one embodiment of the present invention, the copied files include various OS/2 operating system files, CONFIG.SYS, and various device drivers such as SCSI-.SYS (IBM OS/2 versions prior to 2.0), ASPI4OS2.SYS (IBM OS/2 versions prior to 2.0), TAPE.TSD (MS OS/2 LADDR), *.BID (MS OS/2 LADDR), *.ADD (IBM OS/2 2.0), and any backup device drivers.

Operating system installation files are copied (110) from the "Installation" diskette, distributed with the original operating system distribution diskettes, to the recovery diskette. The recovery diskette also includes an application program for implementing the loading or recovery procedure of this invention, and an application program capable of recovering the operating system files from the backup media onto the hard disk of the PC.

Figure 4:
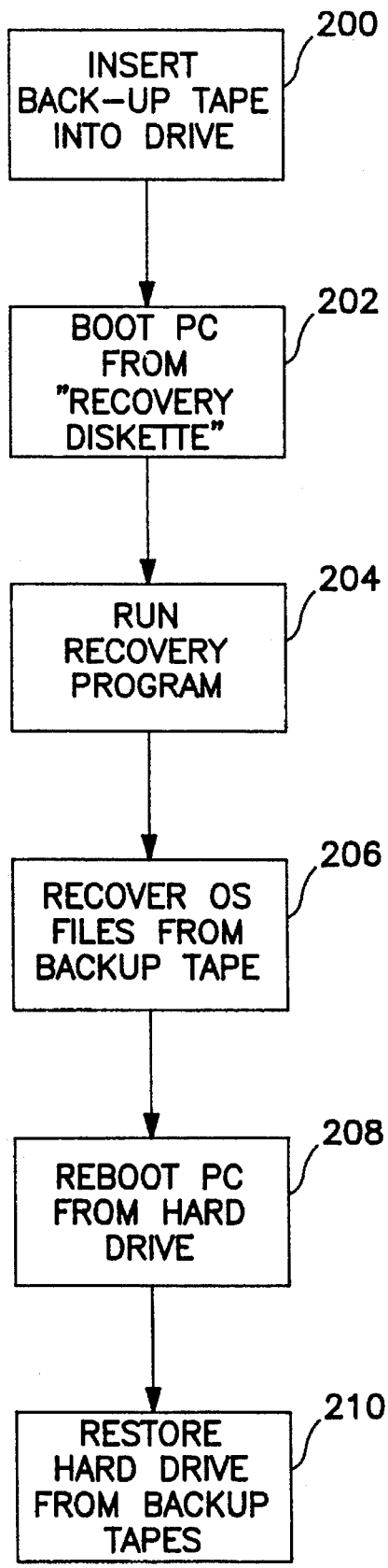
FIG. 4 is a flow diagram showing the implementation of an operating system recover or load procedure of this invention.

FIG. 4 is a flow diagram showing implementation of the operating system recovery and loading procedure of this invention. After a hard disk error affecting the operating system, the PC typically will be incapable of starting (i.e., booting) from the hard disk. Operating system errors will typically result in unreliable operation. Hard disk crashes and other problems that affect the physical hard drive media often require that the hard drive be reformatted and/or repartitioned. In either of these cases, the operating system of the PC needs to be restored to the hard disk before normal hard disk operation of the PC can resume.

To begin the recovery process, the operator inserts (200) the backup tape containing the operating system files to be restored into the PC tape drive. Next, the operator starts (i.e., boots) (202) the PC from the recovery diskette which loads an initial, temporary operating system into the memory of the PC. The recovery diskette also supplies this initial operating system with the necessary system configuration files and device drivers, i.e., the files previously copied to the recovery diskette from the fully configured PC.

In this embodiment, the system is started from the recovery diskette, which includes a copy of the files on the OS/2 Installation diskette distributed with the OS/2 operating system. Alternatively, the system can be started directly from the OS/2 Installation diskette and the recovery diskette is then inserted into the floppy disk drive when the installation process prompts the user for the next diskette.

Next, a recovery program is loaded from the recovery diskette into the PC and run (204) to directly recover (206) the operating system files from the backup tape. Other files on the backup tape can also be restored to the PC by the recovery program. Finally, the PC is rebooted 208 from the recovered operating system files now installed on the hard disk, and the hard drive can be further restored (210) from the backup tape if necessary.

In the case of a PC functioning as a file server on a network, restoration is somewhat modified. In this case, both the PC operating system, the Network operating system, and data files are restored from the backup tape to the hard drive of the server by the recovery program. Access Control Lists (ACL's), associated with each data file to define network user access to the data file, might not be restorable at the same time as the operating systems and data files. This typically occurs because the ACL's for the data files cannot be restored until the server is started, and the server cannot be started until the operating systems are restored. To address this situation, the operating systems are restored first by the recovery program, the server is restarted, and the recovery program is run again. During the second running of the recovery program, the recovery program restores only the ACL's from the backup tape to fully restore the server.

Figure 5:
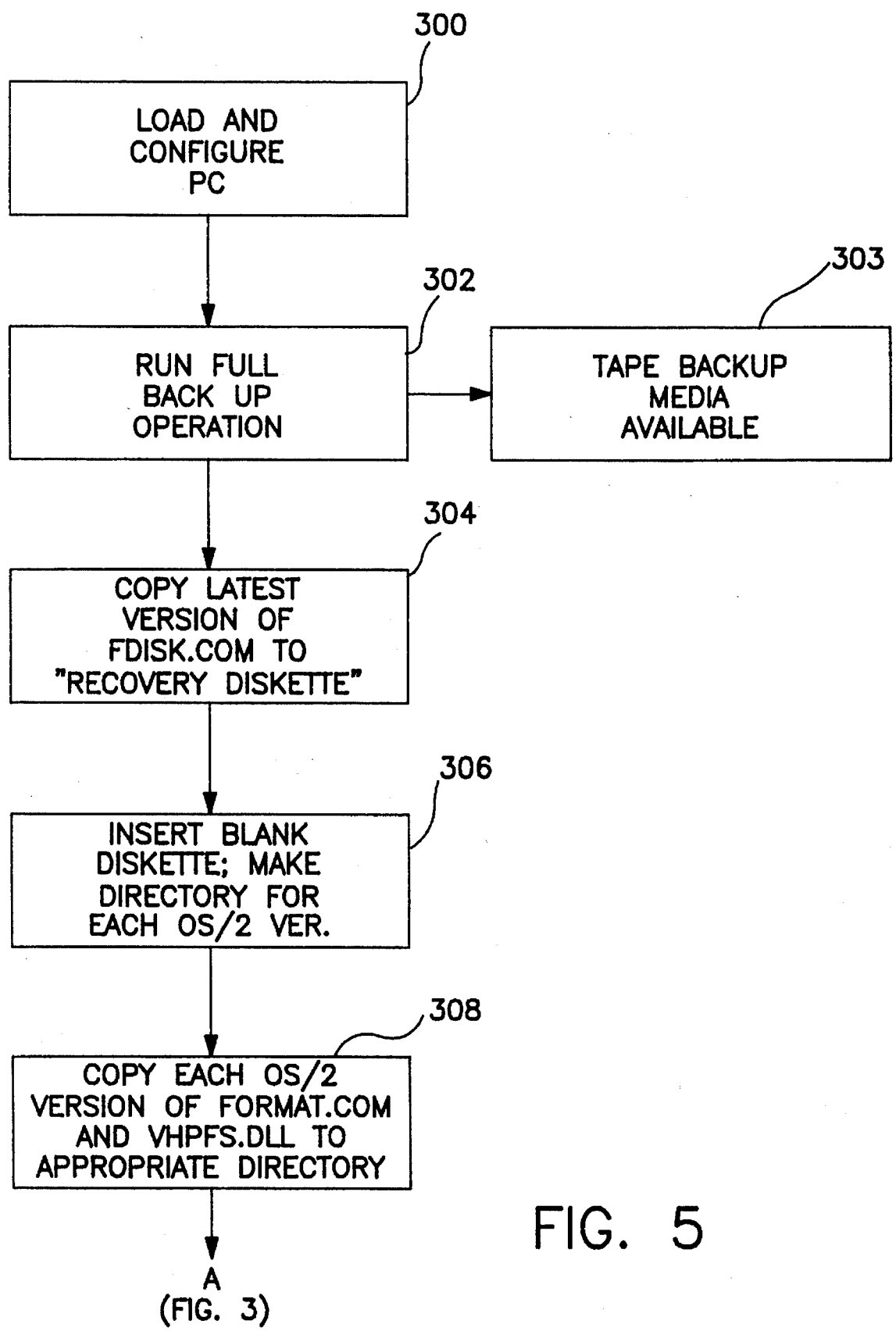
FIG. 5 is a flow diagram showing the storage media setup done prior to implementing a multiple operating system recover or load procedure of this invention.

FIG. 5 is a flow diagram showing an embodiment of the setup procedure of this invention where the PC features multiple versions of IBM OS/2 on various hard drive partitions. This typically occurs where an older and a newer version of the operating system are needed to be simultaneously present on the same PC. In such a case, the hard drive is partitioned into separate logical drives, each supporting a different version of the OS/2 operating system.

As in the single operating system case, the PC is first loaded and configured (300) and a full backup operation (302) is run to generate a set of backup tape media (303). Next, the latest version of the "fix disk" FDISK.COM utility is copied (304) from the hard disk to the recovery diskette.

A "spare" diskette is then inserted (306) into the PC and a directory is setup on this spare diskette for each version of OS/2 present on the hard disk. That is, one directory for each partition. Next, the FORMAT.COM and UHPFS.DLL files from each OS/2 version is copied (308) from the hard drive into the corresponding OS/2 directory of the spare diskette. The remainder of the setup procedure proceeds as shown in FIG. 3 beginning with copying the operating system configuration files (104) to the recovery diskette.

Figure 6A:
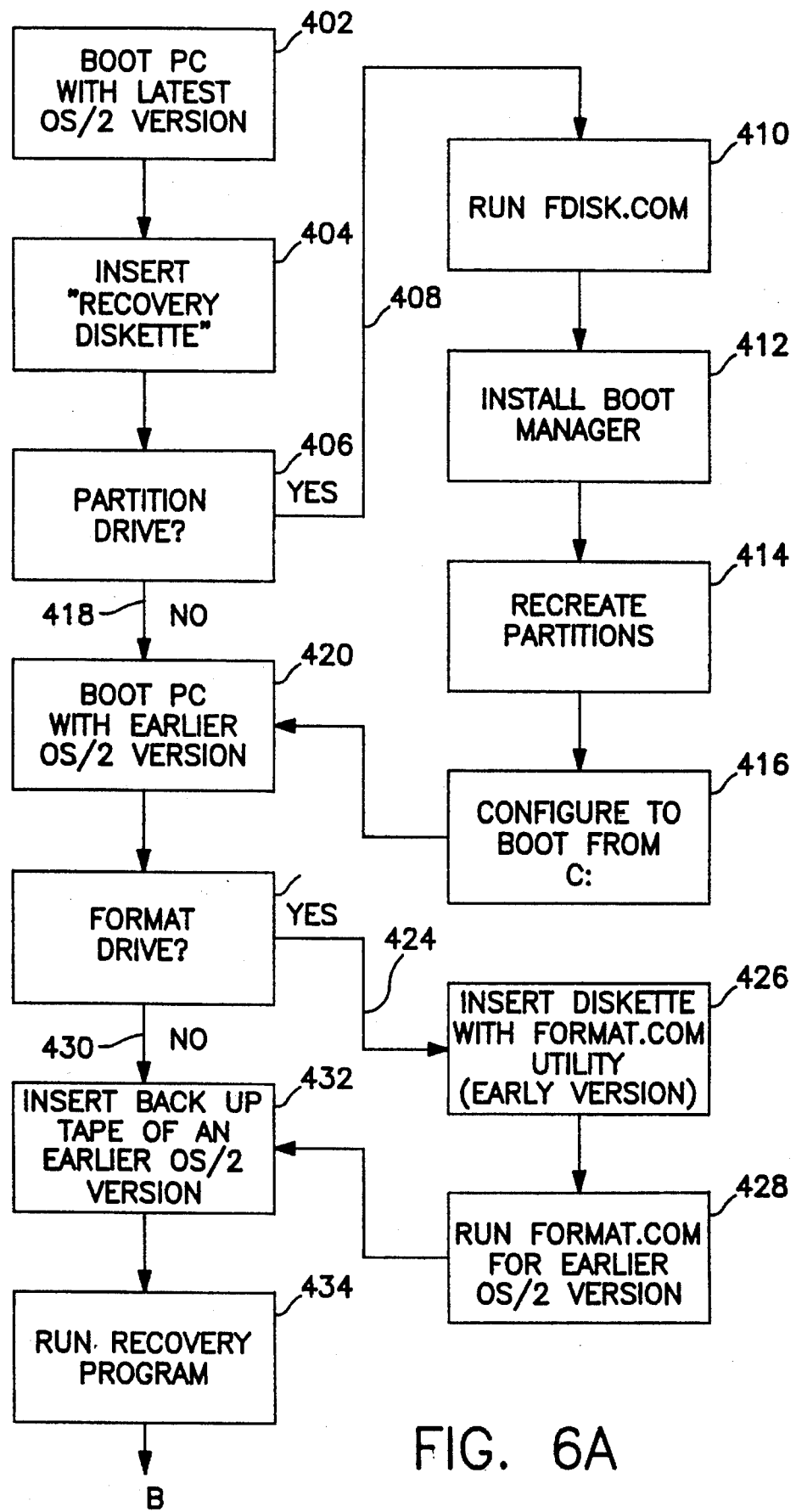
FIG. 6 is a flow diagram showing the implementation of a multiple operating system recover or load procedure of this invention.
Figure 6B:
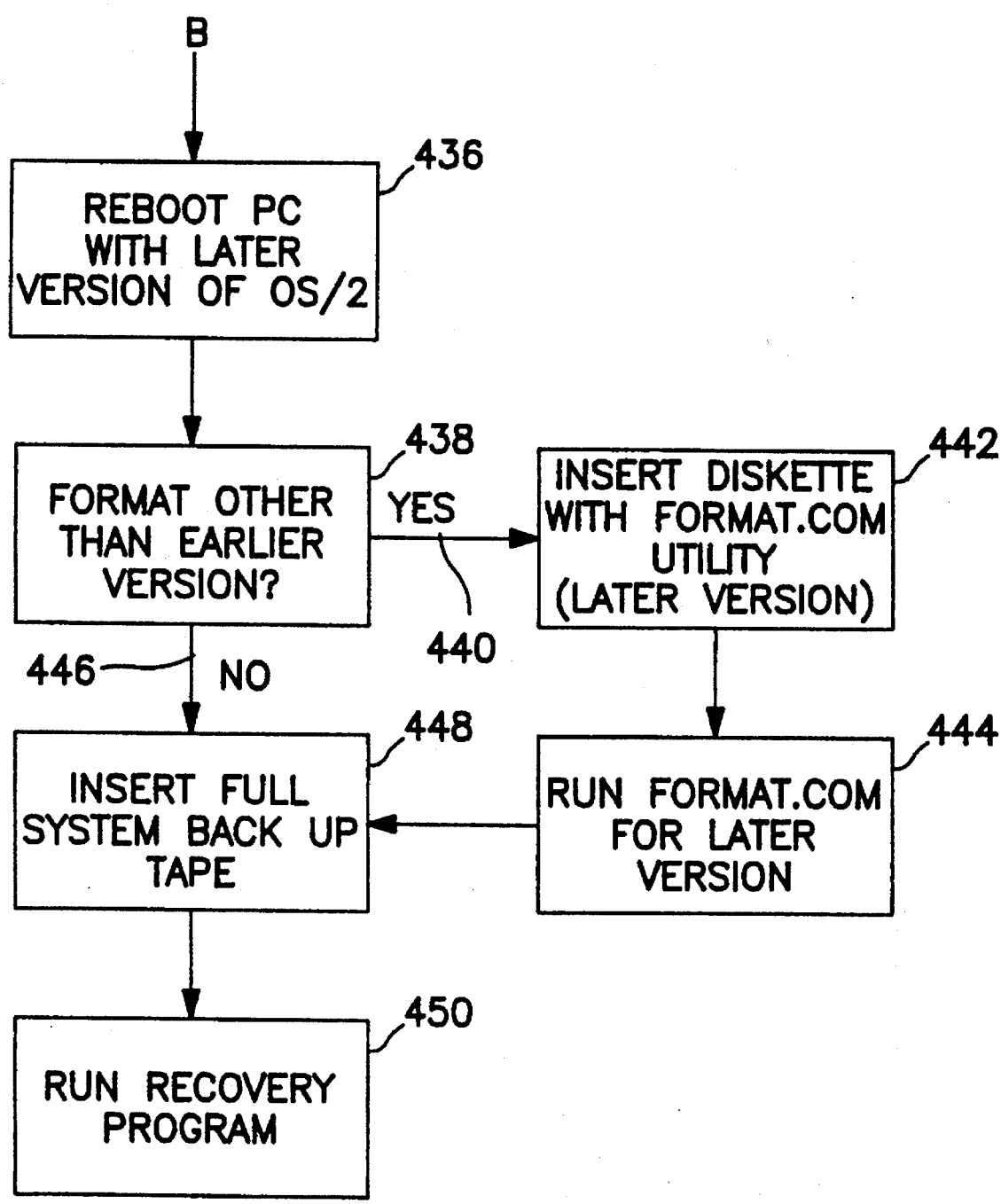

FIG. 6 is a flow diagram showing an embodiment of the invention for restoring multiple versions of the IBM OS/2 operating system onto the PC. First, the PC is booted (402) with the latest version of the OS/2 operating system to be restored on the system. This can be accomplished, for instance, by booting the system from the appropriate OS/2 installation diskette.

Next, the recovery diskette (404) containing the necessary system configuration files and device drivers is inserted into the PC. The operator then determines if the hard drive being restored is to be partitioned (406). If partitioning is desired (408), then the FDISK.COM program is run (410), the standard OS/2 boot manager program is invoked (412), and the desired partitions (414) are recreated on the hard drive. When recreating partitions, the new partitions should be at least as large as the original partitions when the backup tape of the partition was made. The system is then configured by the boot manager (416) to boot from the C: disk drive.

Whether the hard disk was repartitioned (406) or not (418), the PC is next booted (420) with the earlier version of OS/2 to be restored on the system. Thus, if partitioning was desired, the hard drive has now been partitioned using the most recent OS/2 partitioning utilities.

Next, the operator determines whether or not to format (422) the hard drive prior partitions to restoring the operating system to that partition. If formatting of the partition is desired (424), the spare diskette containing the FORMAT.COM utility for the earlier OS/2 version is inserted (426) into the PC. This file is found in the diskette directory corresponding to the earlier OS/2 version. The FORMAT.COM program is run (428) to format the partition corresponding to the earlier OS/2 version format process.

Whether the hard disk was reformatted (424) or not (430), the backup tape containing the earlier OS/2 version is inserted (432) into the system backup tape drive and the recovery program (434) is run to recover the earlier OS/2 version onto the hard disk.

Next, the PC is rebooted (436) with the later OS/2 version, and the operator determines (438) whether to format the hard disk partition prior to restoring this OS/2 version to that partition. If formatting is desired (440), the spare diskette containing the FORMAT.COM utility for this later OS/2 version is inserted (442) into the PC. This file is found in the diskette directory corresponding to the particular OS/2 version. The FORMAT.COM program is run (444) to format the partition corresponding to the later OS/2 version format process.

Whether the hard disk was reformatted (440) or not (446), the backup tape containing the later OS/2 version is inserted (448) into the system backup tape drive and the recovery program is run (450) to restore the later OS/2 version to the hard drive.

Figure 7:
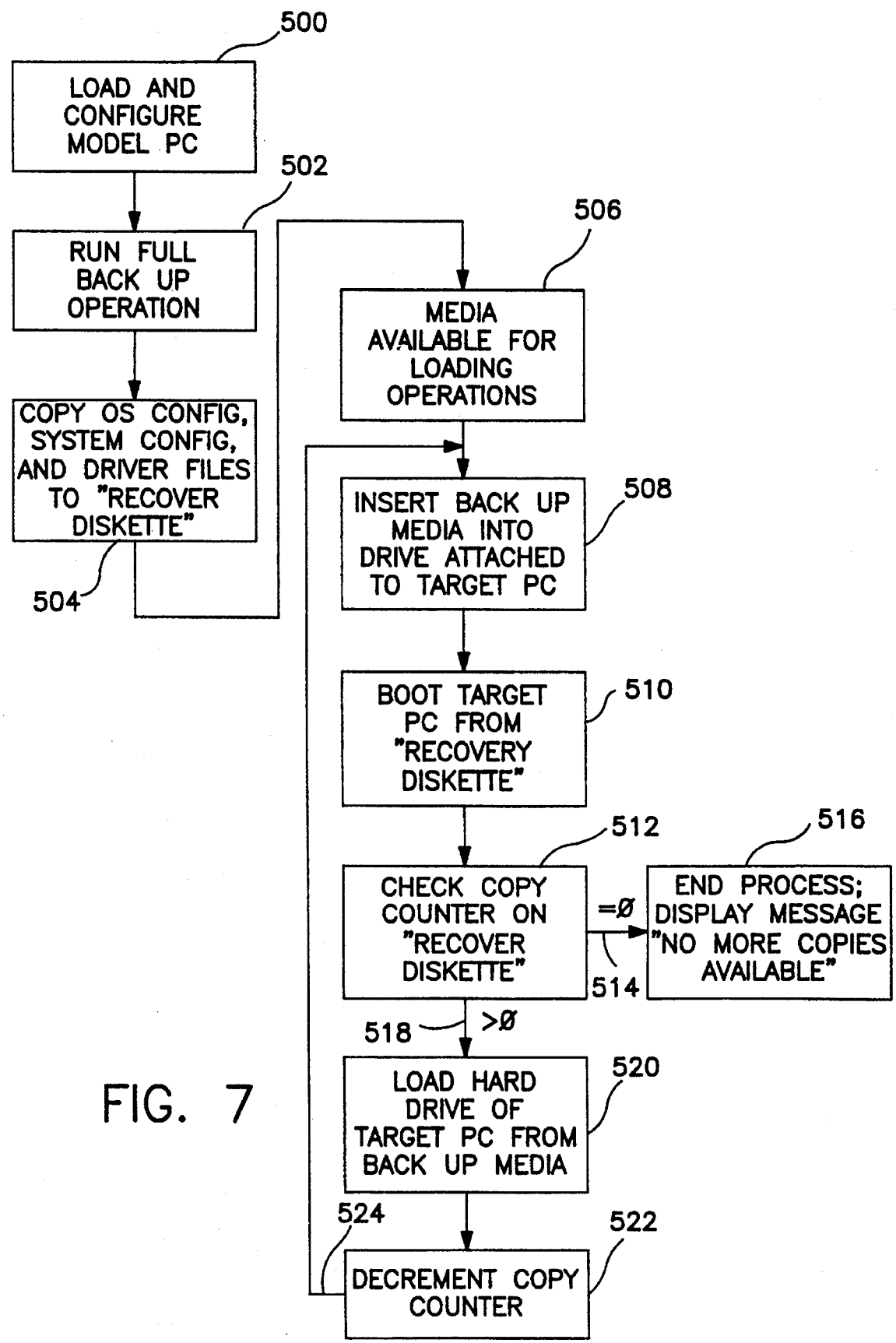
FIG. 7 is a flow diagram showing the implementation of this invention for efficiently factory loading operating systems and application software into multiple data processing systems.

FIG. 7 is a flow diagram showing one embodiment of the invention for efficiently factory loading multiple PC's with operating system and application software. Initially, the hard drive of a "model" PC system is fully loaded and configured (500) with all the operating system files, system configuration files, device driver files, and application software files to be factory loaded onto the target production PC systems. A full backup operation of the model hard drive is then performed (502) to copy all files from the hard drive to backup media, such as magnetic tape or optical disk. The operating system configuration files, system configuration files and device driver files needed for the system configuration are copied (504) from the hard drive of the model PC to the recovery diskette. At this point, all media necessary to fully load multiple PC systems, i.e., the backup media and the recovery diskette, are available (506).

The factory loading of the hard drive of a target PC system is begun by inserting (508) the backup media, previously prepared from the model PC, into a backup media drive connected to the target PC. The backup media drive can be either installed in the target PC or may be temporarily connected to the PC for the loading operation through, for instance, the PC parallel data port. Next, the target PC is booted (510) from the recovery diskette to install a temporary operating system, configuration files, device drivers and a recovery software application program for loading the hard drive of the target PC from the backup media.

The factory loading procedure of this invention can implement a security device for monitoring and controlling the quantity of PC systems that can be factory loaded by using a particular recovery diskette. A copy counter installed on the recovery diskette can track the number of times the diskette has been used to load a PC system, thus limiting the number of factory loads available from the diskette. The recovery application program running on the PC system checks (512) the copy counter on the recovery diskette, and if the counter equals zero (514) then the factory loading process is terminated and a message is displayed to the PC operator that no more copies are available for loading the present PC.

If the copy counter is greater than zero (518), then the loading process continues and the hard drive of the target PC is loaded (520) from the backup media. This loading process results in a PC system having a hard drive loaded and configured identical to the hard drive of the model PC. This load operation can typically take as little as five to ten minutes, rather than the three to five hours typically needed to manually install the same files and configuration onto the PC. After the target PC is successfully loaded from the backup media, the recovery application program decrements (522) the copy counter on the recovery diskette by one, and the entire process is repeated (524) to load the hard drive of another target PC.

While this invention has been particularly shown and described with reference to embodiments thereof, it will be understood by those skilled in the art that various changes in form and details may be made therein without departing from the spirit and scope of the invention as defined by the appended claims. For instance, the backup tape drives described in the embodiments can be replaced by an optical laser disk backup device, or another device suitable for backing up a computer system. The hard drive of the PC described in the embodiments can be replaced by another type of high capacity storage device such as flash memory, optical laser disk, or another suitable device. Furthermore, the recovery diskette can also be replaced by another type of removable media such as an optical laser disk, a non-volatile solid state memory module, or another suitable device.

What is claimed is:

1. A method for loading a fully configured operating system onto a storage device of a data processing system, comprising the steps of:

providing a first media comprising operating system files for installing the fully configured operating system onto the storage device;

providing a second media comprising configuration-specific data files;

initializing the data processing system from the second media to provide a temporary operating system and using the configuration-specific data files to configure the data processing system;

loading the fully configured operating system files from the first media to the storage device using the temporary operating system; and reinitializing the data processing system from the storage device to install the fully configured operating system.

2. The method of claim 1, wherein the step of providing the first media comprises copying the operating system files stored on the storage device to the first media.

3. The method of claim 2, wherein the step of providing the first media further comprises copying all the files from the storage device to the first media.

4. The method of claim 3, wherein the first media comprises magnetic tape, and copying all the files comprises running a data backup routine.

5. The method of claim 1, wherein the step of providing a second media comprises copying the configuration-specific data files from the storage device to the second media.

6. The method of claim 5, wherein the second media comprises a floppy diskette.

7. The method of claim 5, wherein the configuration-specific data files comprise system configuration files.

8. The method of claim 5, wherein the configuration-specific data files comprise operating system configuration files.

9. The method of claim 5, wherein the configuration-specific data files comprise device driver files.

10. The method of claim 1, wherein the storage device comprises a hard disk drive.

11. The method of claim 1, wherein the second media comprises a removable diskette.

12. The method of claim 1, wherein the first media comprises magnetic tape.

13. The method of claim 1, further comprising the step of initializing the storage device prior to the step of loading the fully configured operating system files from the first media to the storage device.

14. The method of claim 13, wherein the step of initializing the storage device comprises formatting the storage device.

15. The method of claim 13, wherein the step of initializing the storage device comprises partitioning the storage device.

16. The method of claim 15, wherein the step of initializing the storage device further comprises formatting a partition of the storage device.

17. The method of claim 16, wherein each partition is formatted using a format command associated with the particular operating system and file system type to be loaded into that partition.

18. A method for loading a fully configured operating system onto a disk drive of a data processing system, comprising the steps of:

copying fully configured operating system files stored on the disk drive to a first media;

copying configuration-specific data files from the disk drive to a second media;

initializing the data processing system from the second media to provide a temporary operating system and using the configuration-specific data files to configure the data processing system;

initializing the disk drive prior to the step of loading the fully configured operating system files from the first media to the disk drives;

loading the fully configured operating system files from the first media to the disk drive using the temporary operating system to install the fully configured operating system; and reinitializing the data processing system from the disk drive to provide the fully configured operating system.

19. The method of claim 18, wherein the step of copying first operating system files comprises copying all the files from the disk drive to the first media.

20. The method of claim 19, wherein the first media comprises magnetic tape, and copying all the files comprises running a data backup routine.

21. The method of claim 20, wherein the second media comprises a removable diskette.

22. The method of claim 18, wherein the configuration-specific data files comprise system configuration files.

23. The method of claim 18, wherein the configuration-specific data files comprise operating system configuration files.

24. The method of claim 18, wherein the configuration-specific data files comprise device driver files.

25. The method of claim 18, wherein the first media comprises magnetic tape.

26. The method of claim 18, wherein the step of initializing the disk drive comprises formatting the disk drive.

27. The method of claim 26, wherein the step of initializing the disk drive step further comprises partitioning the disk drive.

28. The method of claim 18, wherein the step of initializing the disk drive comprises formatting a partition of the disk drive.

29. The method of claim 18, wherein each partition is formatted using a format command specific to the particular operating system to be loaded into that partition.

30. A method for loading a fully configured operating system onto a disk drive of a first data processing system, comprising the steps of:

configuring a disk drive of a second data processing system with the desired configuration for the first data processing system;

copying fully configured operating system fries stored on the disk drive of the second data processing system to a first media;

copying configuration-specific data files from the disk drive of the second data processing system to a second media;

initializing the first data processing system from the second media to provide a temporary operating system and using the configuration-specific data files to configure the first data processing system; and loading the fully configured operating system files from the first media to a disk drive of the first data processing system using the temporary operating system to install the fully configured operating system.

31. The method of claim 30, further comprising the step of limiting to a predetermined quantity the number of times the first operating system files can be loaded from the first media to the disk drive.

32. The method of claim 1, wherein the first media comprises an optical disk.

33. A method for loading a fully configured operating system onto a storage device of a data processing system, comprising the steps of:

initializing the data processing system from a second media, having configuration-specific data files, to provide a temporary operating system using the configuration-specific data files to configure the data processing system;

loading the fully configured operating system files from a first media to the storage device using the temporary operating system, the first media having operating system files for installing the fully configured operating system onto the storage device; and reinitializing the data processing system from the storage device to install the fully configured operating system.

* * * * *

(12) EX PARTE REEXAMINATION CERTIFICATE (7715th)
United States Patent
McGill, III et al.

(10) Number: US 5,469,573 C1
(45) Certificate Issued: Sep. 7, 2010

(54) DISK OPERATING SYSTEM BACKUP AND RECOVERY SYSTEM

(75) Inventors: James K. McGill, III, Dover, MA (US); Dorotea Abele, Sutton, MA (US); Lonnie L. Colman, Natick, MA (US); Manuel Gonsalves, Brookline, MA (US); Sanjeev Saxena, Millbury, MA (US)

(73) Assignee: Veritas Software Corporation, Mountain View, CA (US)

Reexamination Request:
No. 90/008,421, Jan. 11, 2007

Reexamination Certificate for:
Patent No.: 5,469,573
Issued: Nov. 21, 1995
Appl. No.: 08/023,091
Filed: Feb. 26, 1993

(51) Int. Cl.
*G06F 11/14* (2006.01)

(52) U.S. Cl. .......................... 717/127; 707/999.2; 713/1; 713/100; 714/E11.12; 714/E11.121

(58) Field of Classification Search ........................ None
See application file for complete search history.

(56) References Cited

U.S. PATENT DOCUMENTS

| 4,740,890 A | 4/1988 | William |
| 5,469,573 A | 11/1995 | McGill, III et al. |

OTHER PUBLICATIONS

Ira Baxter; "How to Make a Disaster Boot Floppy," Usenet Posting at http://groups–beta.google.com/group/comp.unix.i386/browse_thread/thread/2clfd7fe24f63b6d/7b2f65c81586e16a?hl=en (May 20, 1990) (8 pages).
Tim Parker, "Off the Shelf: Cactus Utilities," Unix Review, at pp. 56–62 (vol. 10, No. 6 Jun. 1992) (10 pages).
"Central Point Backup, Hard Disk Backup for Windows and DOS Manual" (1991) (289 pages).
Van Wolverton & Dan Gookin, "Supercharging MS–DOS" (3d ed. 1991) (462 pages).
Dan Gookin, "Dan Gookin's PC Hotline" (1992) (251 pages).
Dan Gookin, "Hard Disk Management with DOS 5" (ed 3d. 1992) (428 pages).
Microlite Corporation, "CT–BOOT Boot/Filesystem Recovery Programs Supplement to CTAR Operations Guide" (Rev. 3.40, Apr. 4, 1990) (120 pages).
IBM Corporation, "OS/2 Preinstalled, Using the Welcome Folder" ($1^{st}$ ed. Apr. 1992) (54 pages).
Bob Cain, Usenet Postings, http://groups.google.com/group/comp.os.os2.misc/browse_thread/thread/4078a9ebed6f804d/97ee9b9ca98 (May 1992) (13 pages).

(Continued)

*Primary Examiner*—Scott L. Weaver

(57) ABSTRACT

This invention features a data backup procedure and apparatus for backing up and restoring, or otherwise loading a fully configured operating system to the high capacity storage device (e.g., hard disk) of a computer workstation, such as a personal computer. The method includes providing a first media having the desired operating system files to be loaded onto the storage device, providing a second media having configuration-specific data files, initializing the data processing system from the second media to provide a temporary operating system using the configuration-specific data files, loading the desired operating system files from the first media to the storage device using the temporary operating system, and reinitializing the data processing system with the desired operating system from the storage device. Embodiments of the method include providing the first media by copying the desired operating system files, or all the files, stored on the storage device to the first media. The copying can be achieved by running a data backup routine. Other embodiments include providing the configuration-specific data files to the second media by copying the configuration-specific data files from the storage device to the second media.

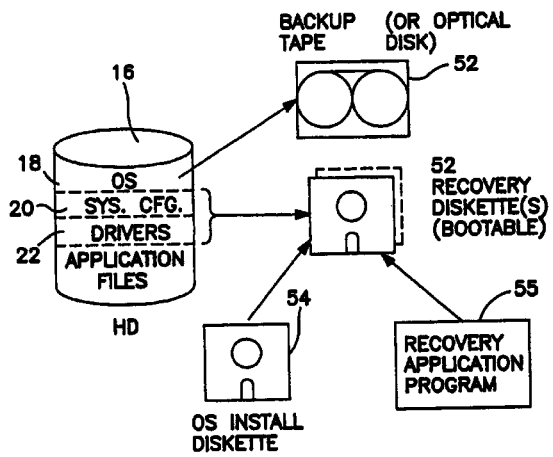

OTHER PUBLICATIONS

Ira Baxter, Brando, Norman Kohn, John Weald, Wm. E. Davidsen Jr., Tom Herbert, "How to make a disaster boot floppy?" *Usenet group: comp.unix.i386* (May 20–30, 1990), archived at http://groups–beta.google.com/group/comp.unix.i386/browse_thread/thread/2c1fd7fe24f63b6d/7b2f65c81586e16a?hl=en (Exh. 2).

CT Boot, Boot/Filesystem Recovery Programs, Supplement to CTAR Operations Guide, Microlite Corp. (1987) (Exh. 3).

D. Thomas Podnar, "Microlite CTAR Product Brochure," Usenet group: biz.sco.announce (Jul. 4, 1992), archived at http://groups–beta.google.com/group/biz.sco.announce/browse_thread/thread/8260762c975081f4/el8b71700b0e514a?hl=en; (Exh. 4).

D. Thomas Podnar, "Microlite CT–BOOT Brochure," Usenet group: biz.sco.announce (Jul. 4, 1992), archived at http://groups–beta.google.com/group/biz.sco.announce/browse_thread/thread/93363520c2c20284/a9341be4e4c975bc?hl=en; (Exh. 5).

Tim Parker, "Cactus Utilities," *UNIX Review*, v. 10, n. 6, (Jun. 1, 1992) (Exh. 6).

Central Point Backup, Hard Disk Backup For Windows And DOS, Central Point Software, Inc. (1991) (Exh. 7).

Van Wolverton, et al., Supercharging MS–DOS, $3^{rd}$ edition, Microsoft Press (1991) (Exh. 8).

Tom Williams, "Optical Storage Inches Toward Standards," *Computer Design*, v28, n19 (Oct. 1, 1989) (Exh. 12).

ASW–310 Sytos Plus Tape Backup Device Module Installation Guide, Adaptec (1991) (Exh. 14).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-33 are cancelled.

New claims 34-41 are added and determined to be patentable.

34. A method for restoring a file server and loading a fully configured computer operating system and network operating system onto a storage device of a data processing system, comprising the steps of:
  providing a first media comprising operating system files for installing the fully configured operating system and the network operating system onto the storage device;
  providing a second media comprising configuration-specific data files;
  initializing the data processing system from the second media to provide a temporary operating system and using the configuration-specific data files to configure the data processing system;
  loading the fully configured operating system files from the first media to the storage device using the temporary operating system;
  reinitializing the data processing system from the storage device to install the fully configured computer operating system and network operating system;
  loading access control lists (ACL's) from the first media to the storage device after the step of reinitializing the data processing system to thereby restore the file server.

35. The method of claim 34, wherein using the configuration-specific data files to configure the temporary operating system comprises using the configuration-specific data files to load a backup device driver for use by the temporary operating system.

36. The method of claim 34, wherein the step of providing the first media comprises copying the operating system files stored on the storage device to the first media and copying the access control lists from the storage device to the first media.

37. The method of claim 36, wherein the step of providing the first media further comprises copying data files stored on the storage device to the first media, wherein the access control lists (ACL's) define network user access to the data files, and wherein the step of loading the fully configured operating system files also includes the step of loading the data files from the first media to the storage device using the temporary operating system.

38. The method of claim 37, wherein the step of loading the fully configured operating system files from the first media to the storage device and the step of loading the access control lists from the first media to the storage device are performed by running a recovery program.

39. The method of claim 38, wherein the first media comprises magnetic tape, and copying all the files comprises running a data backup routine.

40. The method of claim 39, wherein the second media comprises an optical disk.

41. The method of claim 40, wherein the storage device comprises a hard disk drive.

* * * * *